United States Patent Office 3,393,064
Patented July 16, 1968

3,393,064
HERBICIDAL COMPOSITION AND METHOD
Sidney B. Richter, Chicago, Ill., assignor to Velsicol Chemical Corporation, Chicago, Ill., a corporation of Illinois
No Drawing. Original application July 13, 1964, Ser. No. 382,337, now Patent No. 3,334,125, dated Aug. 1, 1967. Divided and this application May 24, 1967, Ser. No. 640,846
3 Claims. (Cl. 71—100)

ABSTRACT OF THE DISCLOSURE

A herbicidal composition comprising an inert carrier and as an essential active ingredient, in a quantity which is injurious to weed seeds and seedlings, a compound of the formula

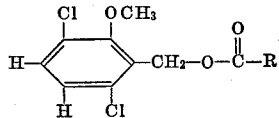

wherein R, containing from 1 to 18 carbon atoms, is selected from the group consisting of alkyl, haloalkyl and alkylthio and

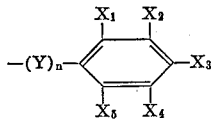

wherein Y is selected from the group consisting of —CH$_2$—, —CH$_2$—O—,

and —S—, $n$ is an integer from 0 to 1, $X_1$, $X_2$, $X_3$, $X_4$, $X_5$ are independently selected from the group consisting of hydrogen, halogen, alkyl, and alkoxy radicals, Z is an unsubstituted lower alkyl group. The method for the control of undesirable plant life by the application of the foregoing composition.

---

This application is a division of our copending application Ser. No. 382,337, filed July 13, 1964, now U.S. Patent No. 3,334,125.

A compound of the formula:

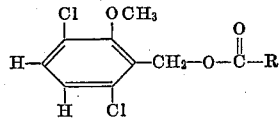

wherein R, containing from 1 to 18 carbon atoms, is selected from the group consisting of alkyl, chloroalkyl and alkylthio and

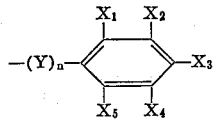

wherein Y is selected from the group consisting of —CH$_2$—, —CH$_2$—O—,

and —S—, $n$ is an integer from 0 to 1, $X_1$, $X_2$, $X_3$, $X_4$, $X_5$ are independently selected from the group consisting of hydrogen, chlorine, alkyl, and alkoxy radicals containing from 1–3 carbon atoms, Z is an unsubstituted lower alkyl group.

This invention relates to new chemical compositions of matter. More specifically, this invention relates to new chemical compounds of the formula:

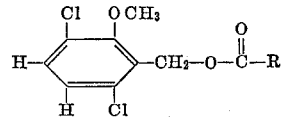

wherein R, containing a range from 1 to 18 carbon atoms, with a most preferred range of from 1 to 12 carbon atoms is selected from the group consisting of alkyl, haloalkyl and alkylthio and

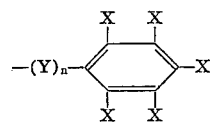

wherein Y is selected from the group consisting of —CH$_2$—, —CH$_2$O—,

and —S—, $n$ is an integer from 0 to 1, X is independently selected from the group consisting of hydrogen, halogen, alkyl and alkoxy radicals. The alkyl and alkoxy groups contain from 1–3 carbon atoms. Z is an unsubstituted lower alkyl group containing from 1–3 carbon atoms.

These new compounds are useful as pesticides, particularly as herbicides, and relate to the control of undesirable plant life.

Prior to the present invention many organic and inorganic substances have been proposed and used in attempts to control undesirable plants. While several of these substances are successful, the problem of controlling the vast number of species of undesirable plant life still exists. Some of the previously proposed substances are toxic to only a few species of plant life, while others are excessively toxic and indiscriminately destroy both desirable and undesirable plant life. Thus, although many substances have heretofore been proposed as herbicides, the problem of the effective and selective control of undesirable plant life still exists. Therefore, one object of the present invention is the destruction of undesirable plant life.

Another object of the present invention is to provide a method for the control of undesirable plant life.

The new compounds of this invention can be prepared readily by the addition of approximately equal molecular proportions of 2-methoxy-3,6-dichlorobenzyl alcohol and an acid chloride of the formula

wherein R is as described above.

The novel alcohol, 2-methoxy-3,6-dichlorobenzyl alcohol, which is used as a reactant in this invention can be prepared conveniently by the reaction of methyl 2-methoxy-3,6-dichlorobenzoate with lithium aluminum hydride in anhydrous ether at low temperature. When 20% hydrochloric acid is added to this reaction mixture an ether layer is formed and the alcohol is then extracted from this layer by methods known to the art, such as reduction under vacuum on a steam bath. The 2-methoxy- 3,6-dichlorobenzoate intermediate is prepared by dissolving 3,6-dichlorosalicylic acid, an acid well known to the art, in acetone. Potassium carbonate and dimethyl sulfate are then added. The mixture is then refluxed, cooled, and filtered. The product is vacuum distilled to arrive at the clear methyl 2-methoxy-3,6-dichlorobenzoate. Examples of the acid chlorides suitable as starting materials in the preparation of the compounds of this invention are: 2-methyl-4-chlorophenoxyacetyl chloride, dichloroacetyl chloride, 2,4-dichlorophenoxyacetyl chloride, chloroacetyl chloride, trichloroacetyl chloride, 2-methoxy-3,6-dichlorobenzoyl chloride, 2,4,5-trichlorophenoxyacetyl chloride, octadecanoyl chloride, benzoyl chloride, propylthiocarbonyl chloride, ethylthiocarbonyl chloride, propionyl chloride, phenylthiocarbonyl chloride, methylthiocarbonyl chloride, and the like.

The alcohol is treated with approximately an equimolecular quantity of acid chloride in benzene, which acts as a solvent, in the presence of a base, such as pyridine. The treatment is performed by heating at reflux for several hours. The product can then be isolated from the reaction mixture by means common to the art, such as vacuum distillation if the product is a liquid, or recrystallization from a suitable solvent if the product is a solid.

Example 1.—Preparation of methyl 2-methoxy-3,6-dichlorobenzoate 3,6-dichlorosalicylic acid (168 g.; 0.8 mole) was dissolved in 500 ml. of reagent grade acetone in a 1 liter flask fitted with a condenser and stirrer. Potassium carbonate (235 g.; 1.70 moles) was added, followed by 161 ml. (1.70 moles) of dimethyl sulfate. The mixture was stirred and refluxed for 17 hrs., cooled, and filtered. The filter cake was washed with acetone, and the combined acetone solutions were reduced on the steam bath. The residue was vacuum distilled to give 168 g. (87.5% of theory) of clear methyl 2-methoxy-3,6-dichlorobenzoate, B.P. 115°/2.4 mm.

Example 2.—Preparation of 2-methoxy-3,6-dichlorobenzyl alcohol

Lithium aluminum hydride (131 g.; 3.44 moles) and anhydrous ether (2 l.) were placed in a 5 l. flask equipped with a stirrer, thermometer, dropping funnel, and condenser fitted with a drying tube. The slurry was cooled to −70° C. on an acetone-Dry Ice bath, and a solution of methyl 2-methoxy-3,6-dichlorobenzoate (809 g.; 3.4 moles) in 2 l. of anhydrous ether was added dropwise. After about half of the solution was added, a very rapid temperature rise from −70° C. to 0° C. was observed. The mixture was allowed to cool to −50° C. before the remainder of the solution was added. The reaction mixture was stirred for 3.5 hrs. at −40° C. to −50° C. and then allowed to warm to −10° C. Water was added dropwise until more gas evolution was observed. Enough 20% hydrochloric acid was added until the mixture separated into two clear layers. The ether layer was removed, and the aqueous layer was extracted twice with ether. The combined ether solutions were washed with water, dried over magnesium sulfate, filtered, and reduced under vacuum on the steam bath to give 683 g. (95.8% of theory) of white, 2-methoxy-3,6-dichlorobenzyl alcohol, M.P. 60–67° C. A sample was recrystallized from dilute ethanol to give a product, M.P. 70.5–71.5° C.

Example 3.—Preparation of 2-methyl-4-chlorophenoxyacetyl chloride 2-methyl-4-chlorophenoxyacetic acid (110.3 g.; 0.55 mole) and 110 ml. benzene were placed in a 1 l. 3-necked flask fitted with a stirrer, condenser, and addition funnel. To this stirred mixture was added thionyl chloride (44 ml., 0.61 mole). The reaction mixture was stirred and refluxed for 6 hrs., dried over magnesium sulfate, and filtered. Distillation of the solvent and excess thionyl chloride under reduced pressure gave a brown liquid, which was vacuum distilled to yield 95 g. (78.7% of theory) of clear, yellow, 2-methyl-4-chlorophenoxyacetyl chloride, B.P. 85–101° C/0.05–0.12 mm.

Example 4.—Preparation of 2-methoxy-3,6-dichlorobenzyl-2′-methyl-4′-chlorophenoxyacetate A 300-ml., 3-necked flask fitted with a stirrer, condenser, and addition funnel was charged with 2-methoxy-3,6-dichlorobenzyl alcohol (10.8 g.; 0.052 mole) in benzene (50 ml.). Pyridine (4.6 ml.; 0.057 mole) was added, and to the stirred mixture was added 2-methyl-4-chlorophenoxyacetyl chloride (11.4 g.; 0.052 mole). The addition was exothermic, and a precipitate of white pyridine hydrochloride formed. The reaction mixture was stirred and refluxed for 6.5 hrs. and filtered. The filter cake was washed three times with benzene. The combined benzene solutions were dried over magnesium sulfate, filtered, and reduced under a vacuum. The white solid residue was recrystallized from heptane to give 13.0 g. (64% of theory) of 2 - methoxy-3,6-dichlorobenzyl-2′-methyl-4′-chlorophenoxyacetate, M.P. 75.5–7° C.

*Analysis.*—For $C_{17}H_{15}Cl_3O_4$: Theory: C, 52.37%; H, 3.85%; Cl, 27.34%. Found: C, 52.32%; H, 4.20%; Cl, 27.06%.

A wide variety of other compounds within the scope of the present invention can be prepared using the procedures and equipment of Examples 1 to 4. In the following examples are given the reactants which were used to prepare the indicated named compounds of this invention. The compound 2-methoxy-3,6-dichlorobenzyl alcohol is designated as Compound A for brevity.

Example 5

Compound A reacted with dichloroacetyl chloride gave a 46.7% yield of 2-methoxy-3,6-dichlorobenzyl dichloroacetate, white needles, M.P. 64.5° C. (from n-pentane).

*Analysis.*—For $C_{10}H_8Cl_4O_3$: Theory: C, 37.74%; H, 2.52%; Cl, 44.65%. Found: C, 37.87%; H, 2.75%; Cl, 43.96%.

Example 6

Compound A reacted with 2,4-dichlorophenoxyacetyl chloride gave a 57% yield of 2-methoxy-3,6-dichlorobenzyl 2′,4′-dichlorophenoxyacetate, white needles, M.P. 91–93.5° C. (from heptane).

*Analysis.*—For $C_{16}H_{12}Cl_4O_4$: Theory: C, 46.83%; H, 2.93%; Cl, 34.63%. Found: C, 46.90%; H, 3.22%; Cl, 33.99%.

Example 7

Compound A reacted with chloroacetyl chloride gave a 58.8% yield of 2-methoxy-3,6-dichlorobenzyl chloroacetate, colorless liquid, B.P. 135–138° C./0.6 mm.

*Analysis.*—For $C_{10}H_9Cl_3O_3$: Theory: C, 42.33%; H, 3.17%; Cl, 37.57%. Found: C, 42.80%; H, 3.89%; Cl, 37.14%.

Example 8

Compound A reacted with trichloroacetyl chloride gave a 65.5% yield of 2-methoxy-3,6-dichlorobenzyl trichloroacetate, light yellow liquid, B.P. 150–160° C./0.7 mm.

*Analysis.*—For $C_{10}H_7Cl_5O_3$: Theory: C, 34.04%; H, 1.99%; Cl, 50.35%. Found: C, 34.59%; H, 2.36%; Cl, 49.46%.

Example 9

Compound A reacted with 2-methoxy-3,6-dichlorobenzoyl chloride gave a 68.2% yield of 2-methoxy-3,6-dichlorobenzyl 2′-methoxy-3′,6′-dichlorobenzoate, viscous yellow liquid, B.P. 211–215° C./0.5 mm.

*Analysis.*—For $C_{16}H_{12}Cl_4O_4$: Theory: C, 46.83%; H, 2.93%; Cl, 34.63%. Found: C, 47.02%; H, 3.22%; Cl, 34.25%.

Example 10

Compound A reacted with 2,4,5-trichlorophenoxyacetyl chloride gave a 68.9% yield of 2-methoxy-3,6-dichlorobenzyl 2′,4′,5′-trichlorophenoxyacetate, white solid, M.P. 127–129° C. (from heptane).

*Analysis.*—For $C_{16}H_{22}Cl_5O_4$ yielded: Theory: C, 43.19%; H, 2.47%; Cl, 39.93%. Found: C, 43.75; H, 2.94%; Cl, 39.20%.

Example 11

Compound A reacted with octadecanoyl chloride gave a 72.1% yield of 2-methoxy-3,6-dichlorobenzyl octadecanoate, colorless liquid, B.P. 220–225° C./0.3 mm.

*Analysis.*—For $C_{24}H_{38}Cl_2O_3$: Theory: C, 64.71%; H, 8.60%; Cl, 15.92%. Found: C, 65.30%; H, 9.06%; Cl, 15.16%.

Example 12

Compound A reacted with benzoyl chloride gave a 73.7% yield of 2-methoxy-3,6-dichlorobenzyl benzoate, colorless liquid, B.P. 150–155° C./0.2 mm.

*Analysis.*—For $C_{15}H_{12}Cl_2O_3$: Theory: C, 57.90%; H, 3.89%; Cl, 22.79%. Found: C, 58.29%; H, 4.04%; Cl, 22.51%.

Example 13

Compound A reacted with acetyl chloride yielded 2-methoxy-3,6-dichlorobenzyl acetate, colorless liquid, B.P. 106° C./0.4 mm.

*Analysis.*—For $C_{10}H_{10}Cl_2O_3$: Theory: C, 48.21%; H, 4.05%; Cl, 28.47%. Found: C, 48.17; H, 4.22%; Cl, 29.10%.

Example 14

Compound A reacted with propylthiocarbonyl chloride yielded 2-methoxy-3,6-dichlorobenzyl propylthiocarbonate, colorless liquid, B.P. 128–133° C./0.15 mm.

*Analysis.*—For $C_{12}H_{14}Cl_2O_3S$ yielded: Theory: C, 46.61%; H, 4.56%; Cl, 22.93%; S, 10.37%. Found: C, 46.89%; H, 4.47%; Cl, 22.93%; S, 10.81%.

Example 15

Compound A reacted with ethylthiocarbonyl chloride yielded 2-methoxy-3,6-dichlorobenzyl ethylthiocarbonate, viscous colorless liquid, B.P. 125–127° C./0.2 mm.

*Analysis.*—For $C_{11}H_{12}Cl_2O_3S$: Theory: C, 44.76%; H, 4.10%; Cl, 24.02%; S, 10.86%. Found: C, 44.96%; H, 4.26%; Cl, 24.43%; S, 11.09%.

Example 16

Compound A reacted with propionyl chloride gave a 72.7% yield of 2-methoxy-3,6-dichlorobenzyl propionate, colorless liquid, B.P. 95–97° C./0.2 mm.

*Analysis.*—For $C_{11}H_{12}Cl_2O_3$: Theory: C, 50.21%; H, 4.60%. Found: C, 49.99%; H, 4.64%.

Example 17

Compound A reacted with phenylthiocarbonyl chloride yielded 2-methoxy-3,6-dichlorobenzyl phenylthiocarbonate, viscous colorless liquid, B.P. 185–190° C./0.3 mm.

*Analysis.*—For $C_{15}H_{12}Cl_2O_3S$: Theory: C, 52.49%; H, 3.52%; Cl, 20.69%; S, 9.34%. Found: C, 52.96%; H, 3.71%; Cl, 20.50%; S, 9.90%.

Example 18

Compound A reacted with methylthiocarbonyl chloride gave an 83.6% yield of 2-methoxy-3,6-dichlorobenzyl methylthiocarbonate, viscous colorless liquid, B.P. 120–122° C./0.15 mm.

*Analysis.*—For $C_{10}H_{10}Cl_2O_3S$: Theory: C, 42.72%; H, 3.59%; Cl, 25.22%; S, 11.40%. Found: C, 42.98%; H, 3.67%; Cl, 25.47%; S, 11.78%.

Example 19

Compound A reacted with α,2-dimethyl-4-chlorophenoxyacetyl chloride gave a 77% yield of 2-methoxy-3,6-dichlorobenzyl - α,2' - dimethyl - 4 - chlorophenoxyacetate, white needles, M.P. 77.5–79° C. (from hexane).

*Analysis.*—For $C_{18}H_{17}Cl_3O_4$: Theory: C, 53.55%; H, 4.24%; Cl, 26.55%. Found: C, 53.76%; H, 4.47%; Cl, 26.22%.

For practical use as herbicides, the compounds of this invention are generally incorporated into herbicidal compositions which comprise an inert carrier and a herbicidally toxic amount of such a compound. Such herbicidal compositions, which are usually known in the art as formulations, enable the active compound to be applied conveniently to the site of the weed infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid herbicidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the weed infestation. The emulsifiers most commonly used in these concentrates are nonionic or mixtures of non-ionic with anionic surface-active agents.

A typical herbicidal composition according to this invention is illustrated by the following example, in which the quantities are in parts by weight.

Example 20.—Preparation of a dust

Product of Example 4 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The herbicides of this invention can be applied in any manner recognized by the art. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lambsquarters, yellow foxtail, crabgrass, wild mustard, French-weed, rye-grass, goose-grass, chickweed, and smartweed; biennials such as wild carrot, great burdock, mullein, round-leaved mallow, blue thistle, bull thistle, hounds-tongue, moth mullein and purple star thistle; or perennials such as white cockle, perennial rye-grass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The method of this invention for the control of weeds comprises contacting said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compounds per acre may be required for good control of a dense infestation of hardy weeds growing under favorable conditions.

The herbicidal toxicity of the new compounds of this invention can be illustrated by many of the established testing techniques known to the art. For example, emulsifiable concentrate compositions can be diluted with water to concentrations equivalents to 4 pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are observed for a week to ten days; and the percent kill, injury, and stand reduction are recorded. The results indicate a high order of herbicidal activity of the compounds of this invention. Comparable pre-planting or post-emergence tests can also be used.

The toxicity of the compounds in this invention to weeds can be demonstrated by a variety of testing techniques known to the art. In one series of experiments, test compounds formulated as aqueous emulsions were sprayed at various dosages on the surface of soil which had been seeded less than twenty-four hours earlier with seeds of crop plants and weeds. After spraying, the soil containers were placed in the greenhouse and provided with supplementary light and heat as required and daily or more frequent watering. The type and severity of injury to each crop and weed was determined 15 to 20 days after the soil treatments. The severity of injury was rated on a 0 to 10 scale as follows: 0=no injury; 1,2=slight injury; 3,4=moderate injury; 5,6=moderately severe injury; 7,8,9=severe injury; 10=death. Some of the results of these tests are presented in the following tables:

TABLE I—CRABGRASS

| Test Chemical | Concn.[1] | Injury Rating |
|---|---|---|
| Product of Example 4 | 2 | 9 |
| Product of Example 4 | 8 | 10 |
| Product of Example 5 | 2 | 8 |
| Product of Example 5 | 8 | 10 |
| Product of Example 6 | 2 | 9 |
| Product of Example 6 | 8 | 8 |
| Product of Example 9 | 2 | 7 |
| Product of Example 9 | 8 | 9 |
| Control | 0 | 0 |

[1] Wherever the concentration is given it is in lbs. actual test chemical per acre.

TABLE II.—DOCK

| Test Chemical | Concn. | Injury Rating |
|---|---|---|
| Product of Example 4 | 2 | 9 |
| Product of Example 4 | 8 | 10 |
| Product of Example 5 | 2 | 9 |
| Product of Example 5 | 8 | 10 |
| Product of Example 12 | 2 | 9 |
| Product of Example 12 | 8 | 10 |
| Product of Example 17 | 2 | 10 |
| Product of Example 17 | 8 | 10 |
| Product of Example 18 | 2 | 10 |
| Product of Example 18 | 8 | 10 |
| Control | 0 | 0 |

TABLE III.—MUSTARD

| Test Chemical | Concn. | Injury Rating |
|---|---|---|
| Product of Example 4 | 2 | 9 |
| Product of Example 4 | 8 | 10 |
| Product of Example 5 | 2 | 9 |
| Product of Example 5 | 8 | 9 |
| Product of Example 9 | 2 | 8 |
| Product of Example 9 | 8 | 9 |
| Product of Example 12 | 2 | 9 |
| Product of Example 12 | 8 | 10 |
| Product of Example 17 | 2 | 8 |
| Product of Example 17 | 8 | 9 |
| Product of Example 18 | 2 | 9 |
| Product of Example 18 | 8 | 9 |
| Control | 0 | 0 |

TABLE IV.—PIGWEED

| Test Chemical | Concn. | Injury Rating |
|---|---|---|
| Product of Example 4 | 2 | 10 |
| Product of Example 4 | 8 | 10 |
| Product of Example 5 | 2 | 10 |
| Product of Example 5 | 8 | 10 |
| Product of Example 6 | 2 | 9 |
| Product of Example 6 | 8 | 8 |
| Product of Example 9 | 2 | 9 |
| Product of Example 9 | 8 | 10 |
| Product of Example 12 | 2 | 9 |
| Product of Example 12 | 8 | 10 |
| Product of Example 17 | 2 | 9 |
| Product of Example 17 | 8 | 10 |
| Product of Example 18 | 2 | 9 |
| Product of Example 18 | 8 | 10 |
| Control | 0 | 0 |

TABLE V.—VELVET LEAF

| Test Chemical | Concn. | Injury Rating |
|---|---|---|
| Product of Example 4 | 2 | 9 |
| Product of Example 4 | 8 | |
| Product of Example 12 | 2 | 10 |
| Product of Example 12 | 8 | 10 |
| Product of Example 18 | 2 | 9 |
| Product of Example 18 | 8 | 10 |
| Control | 0 | 0 |

Another series of tests which were run to show the toxicity of the compounds in this invention was to formulate the test compounds as aqueous emulsions and to spray them at various dosages on the foliage of crop plants and weeks that have attained a prescribed size. After being sprayed the plants were placed in a greenhouse and watered either daily or more frequently. Water was not applied to the foliage of treated plants. The type and severity of injury to each crop and weed were determined 13 days after the plants were treated. The degree of injury was rated on the same basis as in the previous series. Some of the results of these tests are presented in the following tables:

TABLE VI.—DOCK

| Test Chemical | Concn. | Injury Rating |
|---|---|---|
| Product of Example 4 | 2 | 8 |
| Product of Example 4 | 8 | 10 |
| Product of Example 5 | 2 | 9 |
| Product of Example 5 | 8 | 10 |
| Product of Example 6 | 2 | 9 |
| Product of Example 9 | 2 | 9 |
| Product of Example 9 | 8 | 9 |
| Product of Example 18 | 2 | 7 |
| Product of Example 18 | 8 | 10 |
| Control | 0 | 0 |

TABLE VII.—MUSTARD

| Test Chemical | Concn. | Injury Rating |
|---|---|---|
| Product of Example 4 | 2 | 9 |
| Product of Example 4 | 8 | 10 |
| Product of Example 6 | 2 | 10 |
| Product of Example 6 | 8 | 10 |
| Product of Example 9 | 2 | 8 |
| Product of Example 9 | 8 | 8 |
| Product of Example 12 | 2 | 8 |
| Product of Example 12 | 8 | 9 |
| Control | 0 | 0 |

TABLE VIII.—PIGWEED

| Test Chemical | Concn. | Injury Rating |
|---|---|---|
| Product of Example 4 | 2 | 10 |
| Product of Example 4 | 8 | 10 |
| Product of Example 5 | 2 | 7 |
| Product of Example 5 | 8 | 10 |
| Product of Example 6 | 2 | 8 |
| Product of Example 6 | 8 | 9 |
| Product of Example 9 | 2 | 9 |
| Product of Example 9 | 8 | 10 |
| Control | 0 | 0 |

The results in these two series of experiments were particularly significant in view of the fact that the test compounds in practically all cases showed little or no toxicity whatever to corn and wheat at dosages as high as 8 lbs./acre. The compounds are, therefore, particularly valuable for the selective control of weeds in such commercial crops.

We claim:

1. A herbicidal composition comprising an inert carrier and as an essential active ingredient, in a quantity which is injurious to weed seeds and seedlings, a compound of the formula

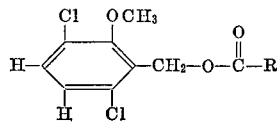

wherein R, containing from 1 to 18 carbon atoms, is selected from the group consisting of alkyl, haloalkyl and alkylthio and

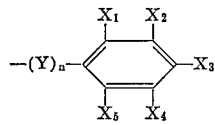

wherein Y is selected from the group consisting of $-CH_2-$, $-CH_2-O-$,

and $-S-$, $n$ is an integer from 0 to 1, $X_1$, $X_2$, $X_3$, $X_4$, $X_5$ are independently selected from the group consisting of hydrogen, halogen, alkyl, and alkoxy radicals, Z is an unsubstituted lower alkyl group.

2. A method for the control of undesirable plant life which comprises applying to soil containing weed seeds and seedlings a herbicidal composition comprising an inert carrier and as an essential active ingredient, in a quantity which is herbicidally toxic to said undesirable plant life, a compound of claim 1.

3. A method for the control of undesirable plant life which comprises applying to the plant life a herbicidal composition comprising an inert carrier and as an essential active ingredient, in a quantity which is herbicidally toxic to said undesirable plant life, a compound of claim 1.

References Cited

UNITED STATES PATENTS 2,394,916   2/1946   Jones _____ 71—115 X
3,336,131   8/1967   Weil et al. _____ 71—118

JAMES O. THOMAS, Jr., *Primary Examiner.*